United States Patent [19]

Yasukawa

[11] Patent Number: 5,276,320
[45] Date of Patent: Jan. 4, 1994

[54] PHOTOMETERING DEVICE

[75] Inventor: Seiichi Yasukawa, Kawasaki, Japan

[73] Assignee: Nikon Corporation, Tokyo, Japan

[21] Appl. No.: 948,598

[22] Filed: Sep. 23, 1992

[30] Foreign Application Priority Data

Oct. 3, 1991 [JP] Japan ................... 3-256238

[51] Int. Cl.$^5$ ............................................ G01J 1/44
[52] U.S. Cl. ........................... 250/214 P; 356/222
[58] Field of Search ............. 250/214 P, 214 C, 214 L, 214 R, 204, 208.2; 356/218, 222, 356/223, 226

[56] References Cited

U.S. PATENT DOCUMENTS

| | | | |
|---|---|---|---|
| 4,650,309 | 3/1987 | Ishida et al. | 250/204 X |
| 4,772,912 | 9/1988 | Ishida et al. | 250/204 X |
| 4,774,401 | 9/1988 | Yamada et al. | 250/214 P X |
| 4,870,443 | 9/1989 | Hayakawa et al. | 356/222 X |
| 4,969,005 | 11/1990 | Tokunaga | 356/222 X |

*Primary Examiner*—Edward P. Westin
*Assistant Examiner*—John R. Lee
*Attorney, Agent, or Firm*—Shapiro and Shapiro

[57] ABSTRACT

A photometering device comprises: a generator for generating an analog voltage output which varies in accordance with a light intensity of an object field and is proportional to an absolute temperature; a reference voltage generator for generating a reference voltage output proportional to an absolute temperature; a switching device for switching the analog voltage output and the reference voltage output; a single output terminal for sequentially outputting the analog voltage output and the reference voltage output switched by the switching device; and an arithmetic operation device having a single analog-digital converter for converting the analog voltage output and the reference voltage output supplied from the single output terminal to digital signals for calculating a photometering value based on the digitally converted analog voltage output and reference voltage output.

3 Claims, 5 Drawing Sheets ically compressed voltage of a photo-diode current which is proportional to the light intensity. This circuit is called a logarithmic compression circuit. Logarithmic compression circuits for the photo-diodes PD2-PD5 are similarly constructed.

PHOTOMETERING DEVICE

BACKGROUND OF THE INVENTION

1. Field of the Invention

The present invention relates to a photometering device used in exposure control or flash light emission control of a camera.

2. Related Background Art

In recent photometering means of a camera, a technique for determining an optimum exposure amount for an object field by photometering the object field by dividing it into a plurality of areas and processing a plurality of light intensity information, that is, a multi-photometering technique is usually used.

A prior art multi-photometering device is explained with reference to FIGS. 4 to 7.

FIG. 7 shows an example of a division pattern of an object field in the multi-photometering. An object light transmitted through a photographing lens (not shown) is directed to a photo-diode array which is divided into the same pattern H1-H5 as that of FIG. 7 and which is arranged in a camera body, and it is converted to an electrical signal for each of the areas H1-H5.

FIG. 4 shows a block diagram of a prior art photometering circuit.

In FIG. 4, B1 denotes an absolute temperature proportional (hereinafter referred to as T-proportional) voltage generator which generates a T-proportional reference voltage VT which is always proportional to only the absolute temperature.

The T-proportional reference voltage VT is outputted from a T-proportional reference voltage output terminal $V_{ref}$ through a buffer amplifier A8.

The T-proportional reference voltage VT is divided at a predetermined ratio by a resistor R1 and a resistor R2, and a voltage VK through a buffer amplifier A7 is applied to all cathodes of photo-diodes PD1-PD5.

The photo-diodes PD1-PD5 correspond to the areas H1-H5 of FIG. 7, respectively. The voltages converted by the photo-diodes are proportional to light intensities and they are affected by a temperature. In order to eliminate the effect of the temperature, the T-proportional reference voltage VT is generated to use it as a power supply voltage of a control circuit.

The cathode of the photo-diode PD1 is connected to a non-inverting input terminal of an amplifier A1 and an anode is connected to an inverting input terminal of A1. The inverting input terminal receives a negative feedback from an output terminal of A1 through a diode D1 so that an output voltage VA1 of the amplifier A1 is a logarithmically compressed voltage of a photo-diode current which is proportional to the light intensity. This circuit is called a logarithmic compression circuit. Logarithmic compression circuits for the photo-diodes PD2-PD5 are similarly constructed.

The outputs of the amplifiers A1-A5 are bound into one signal line through analog switches AS1-AS5 and applied to a non-inverting input terminal of an amplifier A6. A constant current source J1 having a constant current $I_o$ as a sink is connected to an inverting input terminal of the amplifier A6, which receives a negative feedback of a diode D6 from an output terminal thereof. The output terminal of the amplifier A6 is connected to a photometering output voltage output terminal VL.

Five channel selection signals S1-S5 outputted from a shift register SR1 control the turn-on and the turn-off of the analog switches AS1-AS5 which are turned on by Low (L) signals.

An input signal R and an input signal CK for controlling the output of the shift register SR1 are applied to input terminals CS and CLK, respectively.

FIG. 5 shows a control unit of a camera which uses the photometering circuit of FIG. 4. The photometering output terminal VL and the T-proportional reference voltage output terminal $V_{ref}$ of the photometering circuit 5 are connected to AD1 and AD2, respectively, which are input terminals of an analog/digital (A/D) converter built in a microcomputer (CPU) 6. The input terminals CS and CLK of the photometering circuit 5 are connected to output ports P1 and P2 of the CPU 6, respectively. An exposure control circuit 3 and a display circuit 4 receive signals from the CPU 6 to control an iris and a shutter and display the photometering result, respectively.

An operation of FIGS. 4 and 5 is now explained with reference to a timing chart of FIG. 6.

As an initial condition, the CPU 6 sets the outputs of the ports P1 and P2 to High (H) signals. In the photometering circuit 5, when the inputs to the input terminals CS and CLK are both H, only the channel selection signal S1 of the shift register SR1 is L and S2-S5 are H. Accordingly, only the analog switch AS1 of the analog switches AS1-AS5 is turned on and all of AS2-AS5 are turned off. As a result, only the output of the amplifier A1 is connected to the amplifier A6.

A principle of operation of converting a photocurrent to a logarithmically compressed voltage is now explained with reference to the above example.

The photo-diode PD1 produces a photo-current IL1 which is proportional to an input light intensity. Because an input impedance of the amplifier A1 is very high, almost all of the photo-current IL1 flow into D1 and the output VA1 of the amplifier A1 produces a voltage defined as follows.

$$VA1 = VK - (kT/q)\ln(IL1/I_s) \quad (1)$$

where
T: absolute temperature
k: Boltzmann constant
q: charge of electron
$I_s$: backward saturation current of the diode D1.
Since VK is a divided voltage of the T-proportional reference voltage, it is proportional to the absolute temperature. kT/q is also proportional to the absolute temperature. However, since $I_s$ nonlinearly depends on the absolute temperature, the formula (1) is not proportional to the absolute temperature.

When it is applied to the amplifier A6 through the analog switch, the output voltage VA6 of the amplifier A6 is expressed as follows:

$$VA6 = VA1 + (kT/q)\ln(I_o/I_s) \quad (2)$$

By substituting the formula (1), we get $$VA6 = VK - (kT/q)\ln(IL1/I_o) \quad (3)$$

Thus, the term $I_s$ is erased and the output voltage which is completely proportional to the absolute temperature and which is the logarithmic compression of the light intensity is produced. Thus, the amplifier A6 is called an $I_s$ correction amplifier.

In the initial state, a photometering output voltage VL1 for a light intensity of the area H1 is outputted from the terminal VL. When the CPU 6 causes the output of the port P1 to fall (that is, the input to the input terminal CS of the photometering circuit 5), the shift register SR1 is reset and the output of the clock pulse at the port P2 (the input from the input terminal CLK) is monitored. Under this state, the output of the port P2 of the CPU 6 falls five times at a predetermined time interval. The shift register SR1 then sequentially switches the selection signals S1, S2, ... S5 to L each time the input from the input terminal CLK falls.

When the first falling edge is applied from the input terminal CLK, the signal S1 is L so that there is no change from the initial state.

When the second falling edge is applied from the input terminal CLK, the signal S2 is only the analog switch AS2 is turned on and the voltage VA2 which is the logarithmically compressed light intensity of the area H2 is connected to the input of the $I_s$ correction amplifier A6, and the photometering output voltage VL2 is outputted from the terminal VL. Similarly, at each fall of the input terminal CLK, the channel selection signals S3, S4 and S5 sequentially assume the L-level and the photometering output voltage from the terminal VL is switched to VL2, VL3, VL4 and VL5. The serial output of the photometering output voltage serves to reduce the number of output terminals. Each time the CPU 6 causes the output of port P1 to fall, it A/D—converts the voltage at the A/D conversion input terminal AD1 and temporarily stores the converted output in a memory. When the A/D conversion and the storing are completed for five areas, it A/D—converts the T-proportional reference voltage which is applied to the A/D conversion input terminal AD2 from the terminal $V_{ref}$, and temporarily stores the result.

The CPU 6 calculates the photometering information free from the temperature component based on the A/D conversion outputs of the five areas and the A/D conversion output of the T-proportional reference voltage, which are stored in the memory, and calculates control data for the exposure control and the display of the photometering results based on the calculated photometering information and an exposure amount calculation algorithm, and supplies signals to the exposure control circuit 3 and the display circuit 4.

In the prior art, the light intensity distribution information for the multi-photometering is obtained by the construction and operation described above.

In the prior art, one output terminal for outputting an analog voltage which is generated in accordance with the light intensity of the object field and one output terminal for outputting the T-proportional reference voltage are required to eliminate the temperature component. On the other hand, it is a common technique to apply the analog voltage and the T-proportional reference voltage to the A/D converter of the CPU 6, convert them to the digital signals, and calculate a ratio of those signals by the arithmetic operation means to obtain the photometering output.

Thus, two of the limited number of A/D converters of the CPU 6 are occupied, and a problem of shortage of A/D converters occurs when the A/D converters are to be used for other purposes such as CCD data for range finding.

SUMMARY OF THE INVENTION

It is an object of the present invention to provide a photometering device which reduces the number of output terminal for transferring an analog signal relating to a photometering function to measure distance or color, to one.

In order to achieve the above object, the photometering device of the present invention comprises: a generator (PD1, A1, D1–D5, A5, D5) for generating an analog voltage which varies in accordance with a light intensity of an object field and is proportional to an absolute temperature; a reference voltage generator (B1) for generating a reference voltage proportional to an absolute temperature; switching means (AS6, AS7, G1) for switching the analog voltage output and the reference voltage output; a single output terminal (Vout) for sequentially outputting the analog voltage output and the reference voltage output switched by said switching means; and arithmetic operation means (CPU) having a single analog-digital converter for converting the analog voltage and the reference voltage supplied from said single output terminal to digital signals for calculating a photometering value based on the digitally converted analog voltage and reference voltage.

In accordance with one aspect of the present invention, the switching means selectively outputs the T-proportional reference voltage output and the analog voltage output from the single output terminal. Accordingly, only one A/D converter of the arithmetic operation means is occupied. Thus, waste free design is attained and a freedom of design for other parts is enhanced.

In accordance with another aspect of the present invention, the T-proportional reference voltage output and the analog voltage output can be outputted in any order. Thus, the order may be assigned to fit to the design of the photometering device.

DETAILED DESCRIPTION OF THE PREFERRED EMBODIMENTS

Figure 1:
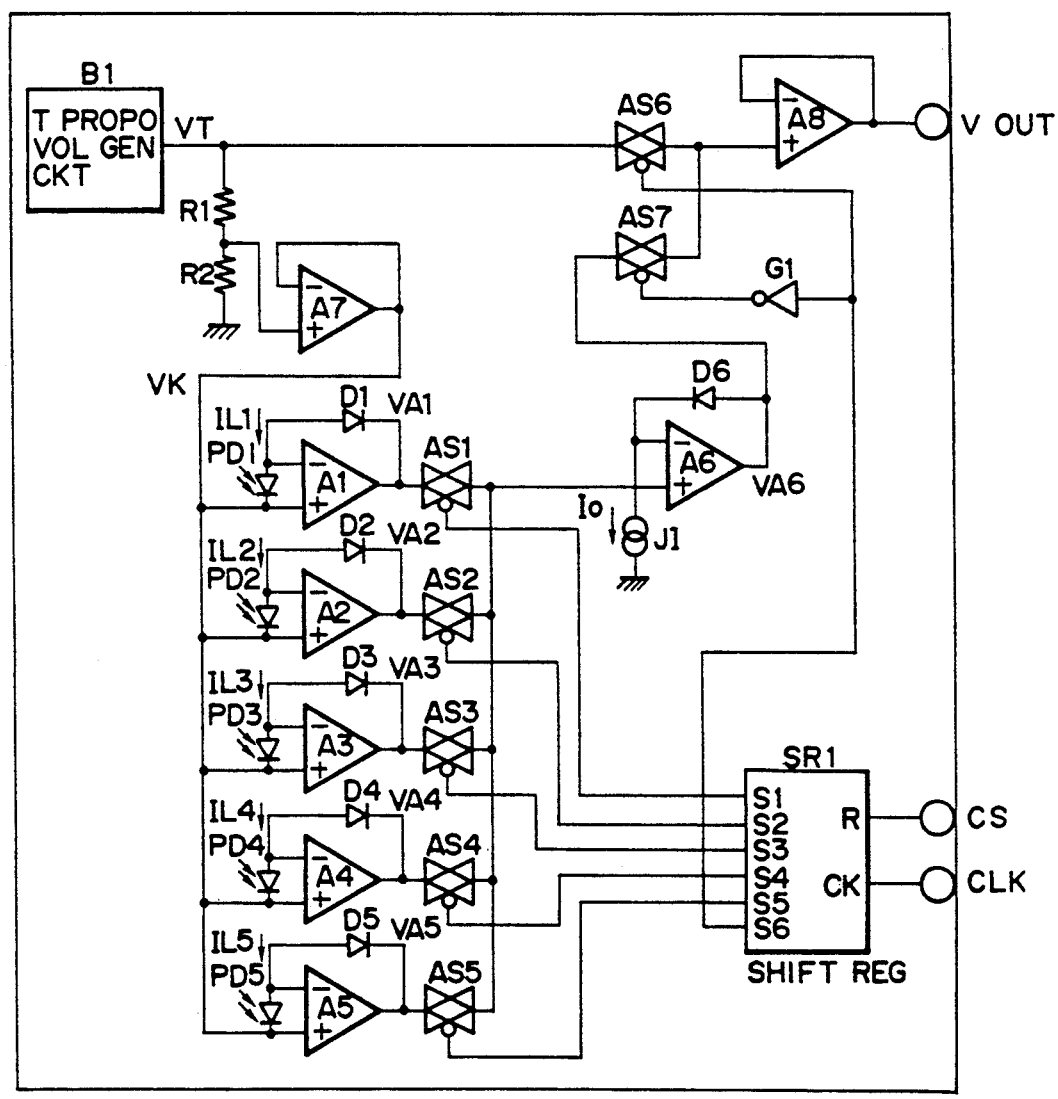
FIG. 1 shows a block diagram of a photometering circuit of the present invention.
Figure 2:
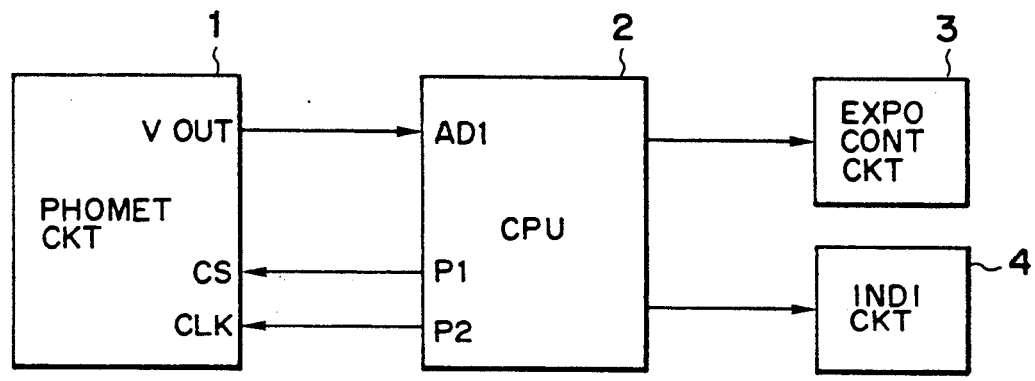
FIG. 2 shows a block diagram of a control unit of a camera which embodies the photometering circuit of the present invention.
Figure 3:
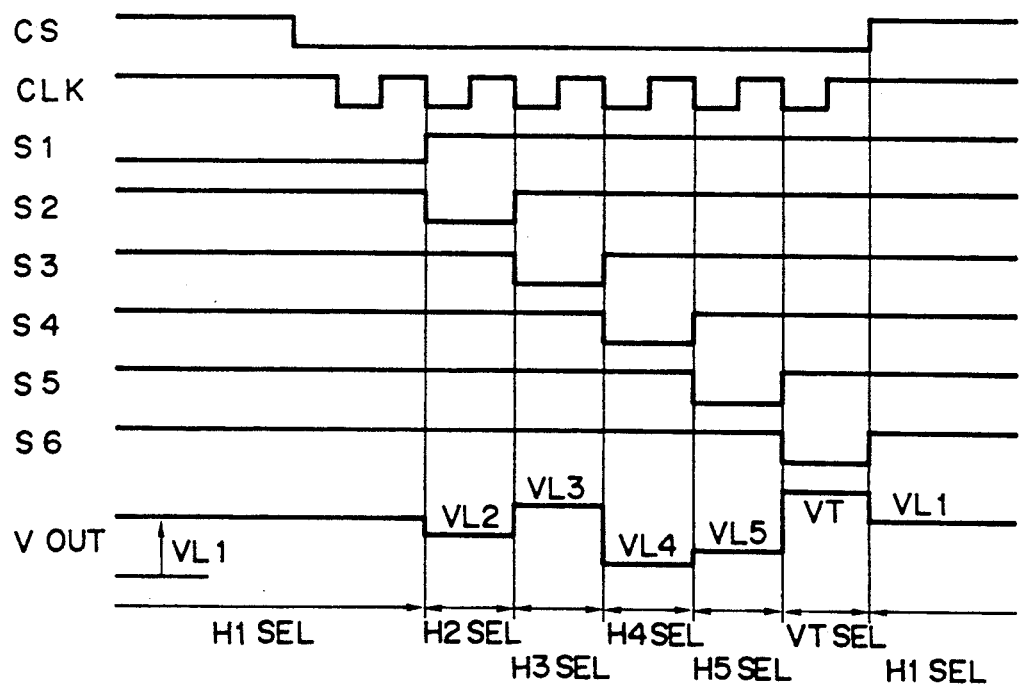
FIG. 3 shows an operation timing chart of the present invention.

FIGS. 1, 2 and 3 show an embodiment of the present invention. The present embodiment is now explained in comparison with the prior art.

FIG. 1 shows a block diagram of the photometering circuit in accordance with the present embodiment.

Figure 4:
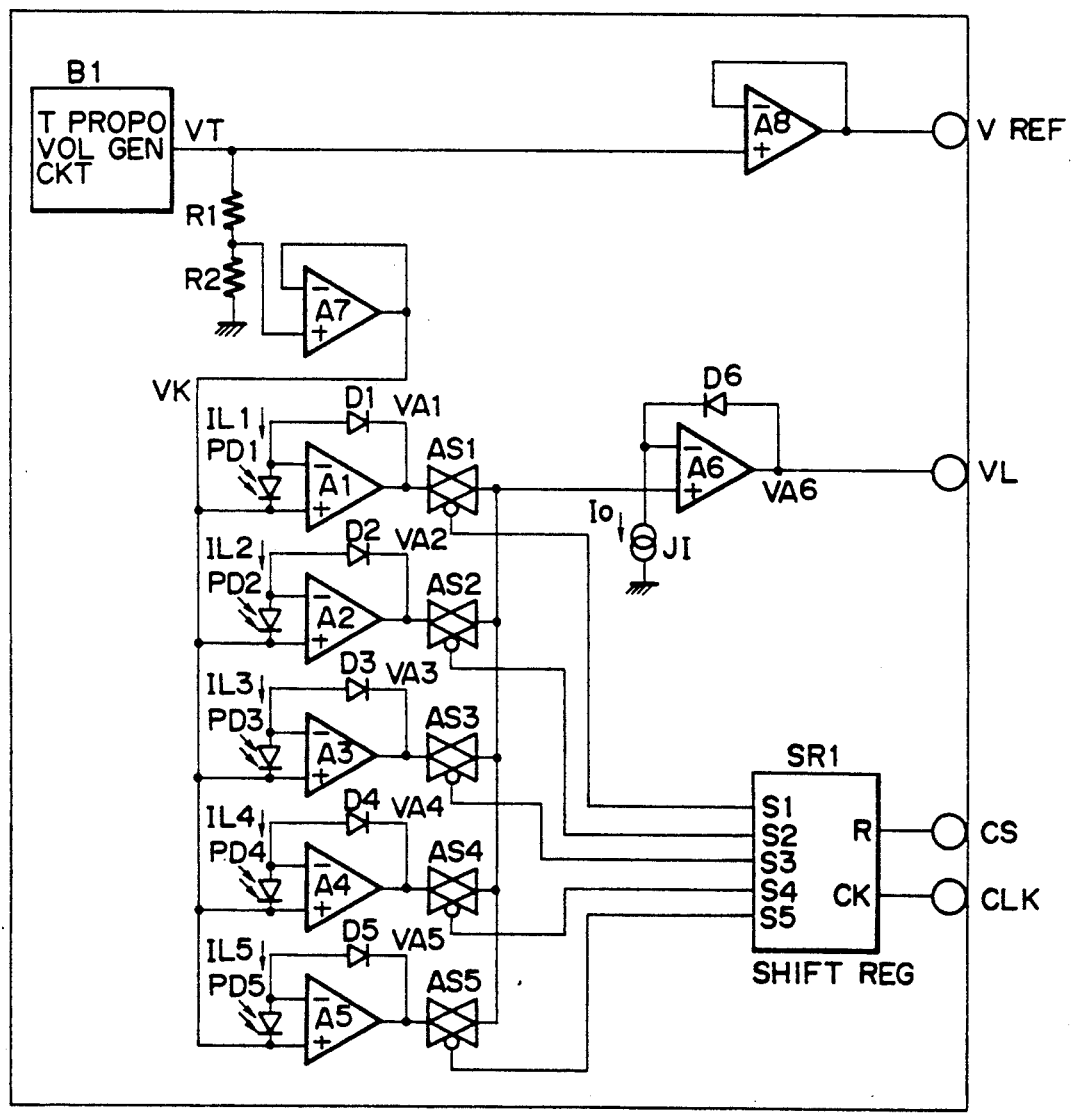
FIG. 4 shows a block diagram of a prior art photometering circuit.
Figure 5:
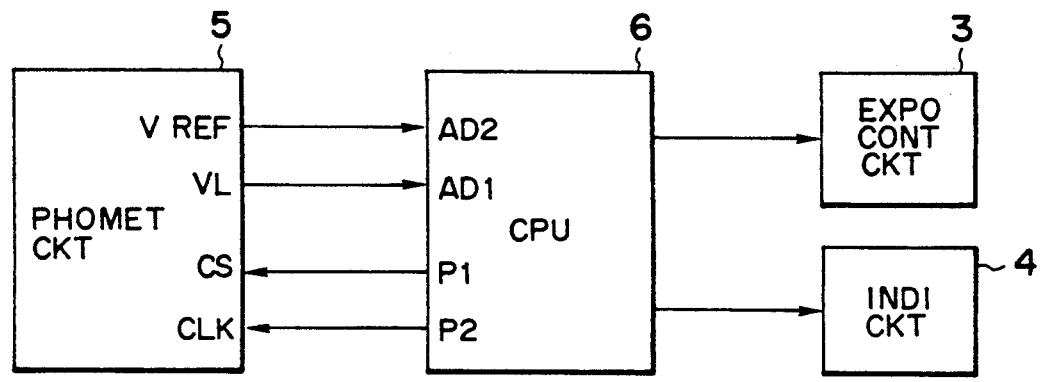
FIG. 5 shows a block diagram of a control unit of a camera which embodies the prior art photometering circuit.
Figure 6:
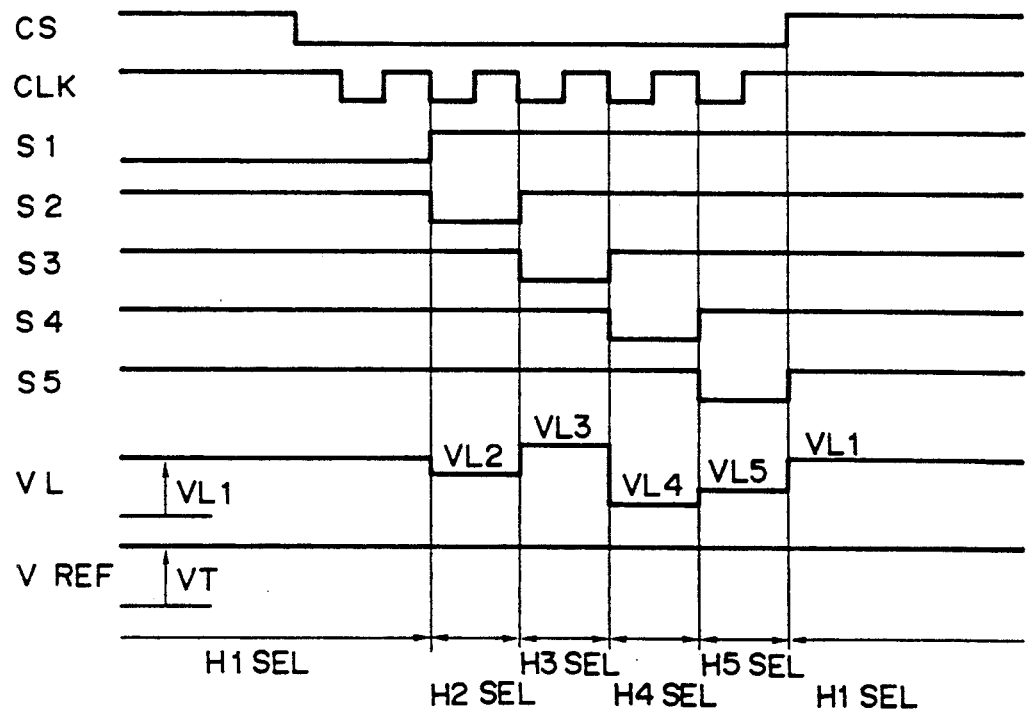
FIG. 6 shows an operation timing chart of the prior art.
Figure 7:
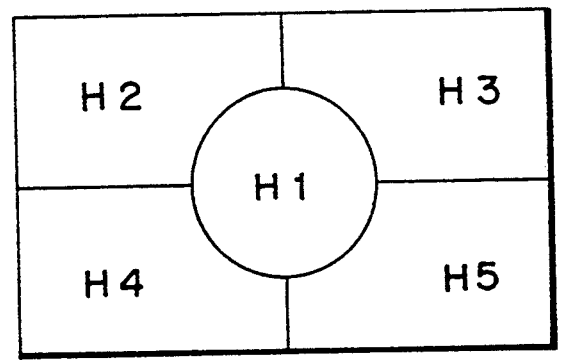
FIG. 7 shows the division of an object field in the multi-photometering.

A T-proportional voltage generator B1, voltage dividing resistors R1 and R2, a buffer amplifier A7, photo-diodes PD1–PD5, five logarithmic compression circuits including amplifiers A1–A5, analog switches AS1-AS5 and an $I_s$ correction amplifier A6 are identical to those of the prior art shown in FIG. 4.

The input signals to the shift register SR1 use two terminals as they do in the prior art, but there are six channel selection signals use six lines S1-S6 with S6 being added to the prior art. The signals S1-S5 are connected to the analog switches AS1-AS5 as the control signals to the analog switches as they are in the prior art.

The signal S6 functions as a control signal to an analog switch AS6 which is inserted between the output of the T-proportional voltage generator and a buffer amplifier A8, and also functions as a control signal to an analog switch AS7 which is inserted between the $I_s$ correction amplifier A6 and the buffer amplifier A8, through an inverting gate G1. The control signals to the analog switches AS6 and AS7 are of opposite phases so that one of them is in on-state while the other is in off-state.

The output of the buffer amplifier A8 is a consolidated output terminal Vout to the external. The photometering output voltage output terminal VL and the T-proportional reference voltage output terminal Vref of the prior art are consolidated to the single output terminal Vout.

FIG. 2 shows a control unit of a camera which embodies the photometering circuit of FIG. 1.

The consolidated output terminal Vout of the photometering circuit 1 is connected to an input terminal AD1 of an A/D converter built in a CPU 2. The input terminals CS and CLK of the photometering circuit 1 are connected to output ports P1 and P2 of the CPU 2, respectively. An exposure control circuit 3 and a display circuit 4 respond to signals from the CPU 2 to control the iris and the shutter and display the photometering result.

An operation of FIGS. 1 and 2 is now explained with reference to a timing chart of FIG. 3.

In an initial state, the CPU 2 renders the ports P1 and P2 to the H-level. In the photometering circuit 1, when the input terminals CS and CLK are both H, only the channel selection signal S1 of the shift register SR1 is L and the signals S2-S6 are H.

Accordingly, only the analog switch AS1 is turned on and the analog switches AS2-AS5 are turned off, and the output of the amplifier A1 is connected to the $I_s$ correction amplifier A6. The analog switch AS6 is turned off and the analog switch AS7 is turned on, and the output of the $I_s$ correction amplifier A6 is connected to the buffer amplifier A8.

A relationship between the photo-current and the output voltage of the $I_s$ correction amplifier A6 under this state is exactly the same as that of the prior art. In the initial state, the photometering output voltage VL1 to the light intensity of the area H1 is outputted from the consolidated output terminal Vout through the analog switch AS7 and the buffer amplifier A8. When the CPU 2 causes the output of the port P1 to fall (that is, the input to the input terminal CS of the photometering circuit 1), the shift register SR1 is reset and the photometering circuit monitors the clock pulse from the input terminal CLK. Under this state, the output of the port P2 of he CPU 2 (that is, the input to the terminal CLK of the photometering circuit 1) falls six times at a predetermined time interval. The shift register SR1 sequentially renders the signals S1, S2, . . . , S5 and S6 to the L-level at each fall of the terminal CLK. When the input to the input terminal CS rises, one cycle of operation of the photometering circuit of the present embodiment is over. The photometering is always done when the power supply is on, and the input to the input terminal CS is repeatedly switched between L and H.

When the first falling edge is applied from the input terminal CLK, the photometering circuit 1 outputs the L-level channel selection signal S1. Accordingly, there is no change from the initial state. When the second falling edge is applied from the input terminal CLK, the channel selection signal S1 is H and S2 is L. Thus, only the analog switch AS2 is turned on and the voltage VA2 which is the logarithmic compression of the light intensity of the area H2 is applied to the input of the amplifier A6. Since the analog switch AS7 is still connected to the buffer amplifier A8, the photometering output voltage VL2 corresponding to the area H2 is outputted from the consolidated output terminal Vout. Similarly, at each fall of the input terminal CLK, the channel selection signals, S2, S3, S4 and S5 are sequentially rendered to the L-level and the voltage outputted from the consolidated output terminal Vout is switched to VL2, VL3, VL4 and VL5. When the voltage of the input terminal CLK falls once more, only the channel selection signal S6 of the shift register SR1 is L and all others are H so that the analog switch AS6 is turned on and the analog switch AS7 is turned off. Thus, the buffer amplifier A8 switches from the $I_s$ correction amplifier A6 to the T-proportional voltage generator B1 so that the T-proportional reference voltage VT is outputted from the consolidated output terminal Vout.

Each time the voltage of port P1 falls, the CPU 2 AD-converts the voltage at the A/D conversion input terminal AD1 and temporarily stores the conversion result in a memory. In this manner, the A/D conversion results of the photometering output voltages for the five areas and the A/D conversion result of the T-proportional reference voltage are stored.

The CPU 2 calculates the photometering information free from the temperature component based on the A/D conversion results of the photometering output voltages for the five areas and the A/D conversion result of the T-proportional reference voltage, which have been stored in the memory, and calculates control data for the exposure control and the display of the photometering result based on the calculated photometering information and an exposure amount calculation algorithm, and sends signals to the exposure control circuit 3 and the display circuit 4.

In the present embodiment, the photometering output voltages and the T-proportional reference voltage are outputted from the consolidated output terminal Vout in such an order that the T-proportional reference voltage is outputted last. Alternatively, it may be outputted first or second, or it may be outputted last but the T-proportional reference voltage is outputted in the initial state. Such a variation is a matter of design of the logic circuit of the shift register and any order may be assigned to fit to the system design.

The present invention is applicable to not only the photometering device but also any data output circuit designed to operate with a T-proportional system such as a TTL multi-dimmer detection unit or a color measurement unit. The more the number of detection units designed by the T-proportional systems, the higher is the effect of the present invention.

In accordance with the present invention, the analog voltage which is generated in accordance with the light intensity of the object field and the T-proportional reference voltage can be outputted from the single output terminal by adding the switching means to the prior art photometering device. Since those output voltages are A/D—converted by the single A/D converter, the waste-free design is permitted and the freedom of design for other parts is enhanced.

The number of wirings between the analog voltage generation circuit and the arithmetic operation means is reduced by one compared to the prior art, and the packaging space is saved, which contributes to the compactness of the equipment such as a camera.

Further, since the analog voltages and the reference voltage can be outputted from the single output terminal in any order by switching them, the flexibility to design the photometering device is enhanced.

What is claimed is:

1. A photometering device comprising:
    a generator for generating an analog voltage output which varies in accordance with a light intensity of an object field and is proportional to an absolute temperature;
    a reference voltage generator for generating a reference voltage output proportional to an absolute temperature;
    switching means for switching the analog voltage output and the reference voltage output;
    a single output terminal for sequentially outputting the analog voltage output and the reference voltage output switched by said switching means; and
    arithmetic operation means having a single analog-digital converter for converting the analog voltage output and the reference voltage output supplied from said single output terminal to digital signals for calculating a photometering value based on the digitally converted analog voltage output and reference voltage output.

2. A photometering device according to claim 1 wherein said switching means switches such that the reference voltage output is outputted after the analog voltage output has been outputted.

3. A photometering device according to claim 1 wherein said switching means switches such that the analog voltage output is outputted after the reference voltage output has been outputted.

* * * * *